US006549860B1

(12) United States Patent
Lillard

(10) Patent No.: US 6,549,860 B1
(45) Date of Patent: Apr. 15, 2003

(54) METHOD AND APPARATUS FOR TUNING A MEGASONIC TRANSDUCER

(75) Inventor: Raymond Y. Lillard, Redwood City, CA (US)

(73) Assignee: Product Systems Incorporated, Campbell, CA (US)

(*) Notice: Subject to any disclaimer, the term of this patent is extended or adjusted under 35 U.S.C. 154(b) by 188 days.

(21) Appl. No.: 09/687,857

(22) Filed: Oct. 13, 2000

(51) Int. Cl.$^{7}$ .................................................. G06F 17/11

(52) U.S. Cl. .......................... 702/75; 702/76; 702/106; 702/107; 310/334

(58) Field of Search .............................. 702/75, 60, 76, 702/106, 107, 112, 116, 124, 126, 117, 182, 183, 189, 194, 103–105, FOR 157, FOR 170, FOR 171, FOR 103, FOR 104, FOR 106–FOR 108, FOR 134, FOR 135, FOR 156; 324/727, 600; 310/334, 325, 316.01; 134/184, 902, 113; 73/579, 602, 514.34, DIG. 4

(56) References Cited

U.S. PATENT DOCUMENTS 4,804,007 A 2/1989 Bran .......................... 134/184
5,444,641 A * 8/1995 White ........................ 324/600
5,931,173 A * 8/1999 Schiele ....................... 134/113
6,047,246 A 4/2000 Vickers et al. .............. 702/105
6,188,162 B1 2/2001 Vennerbeck ................ 310/334
6,222,305 B1 4/2001 Beck et al. ................. 310/334
6,313,565 B1 * 11/2001 Puskas .................. 310/316.01

* cited by examiner

*Primary Examiner*—Hal Wachsman
(74) *Attorney, Agent, or Firm*—Donald J. Pagel

(57) ABSTRACT

A method and apparatus for selecting an optimum frequency for driving a transducer in a megasonic cleaning system. The method comprises the steps of selecting a plurality of frequency values that span a frequency range containing an optimum frequency for driving a piezoelectric crystal, determining the reflection coefficient at each frequency value, fitting the data set to a function, obtaining the first derivative equation of the function, finding the roots of the first derivative equation to yield a set of roots, and selecting the optimum frequency from the set of roots. The reflection coefficient is defined as the reflected power divided by the forward power. The apparatus comprises a microprocessor, a frequency generator, a directional coupler/detector and an analog to digital converter circuit. Software running on the microprocessor uses a forward power signal and a reflected power signal from the analog to digital converter circuit to generate the reflection coefficient and to calculate the optimum frequency for driving the megasonic transducer.

14 Claims, 7 Drawing Sheets

METHOD AND APPARATUS FOR TUNING A MEGASONIC TRANSDUCER

TECHNICAL FIELD

The present invention relates to megasonic cleaning systems and more particularly to a method and apparatus for determining the optimum frequency at which to drive the megasonic transducer.

BACKGROUND INFORMATION

It is well-known that sound waves in the frequency range of 0.4 to 2.0 megahertz (MHZ) can be transmitted into liquids and used to clean particulate matter from damage sensitive substrates. Since this frequency range is predominantly near the megahertz range, the cleaning process is commonly referred to as megasonic cleaning. Among the items that can be cleaned with this process are semiconductor wafers in various stages of the semiconductor device manufacturing process, disk drive media, flat panel displays and other sensitive substrates.

Megasonic acoustic energy is generally created by exciting a crystal with radio frequency AC voltage. The acoustical energy generated by the crystal is passed through an energy transmitting member and into the cleaning fluid. Frequently, the energy transmitting member is a wall of the vessel that holds the cleaning fluid. The crystal and its related components are referred to as a megasonic transducer. For example, U.S. Pat. No. 5,355,048, discloses a megasonic transducer comprised of a piezoelectric crystal attached to a quartz window by several attachment layers. The megasonic transducer operates at approximately 850 KHz. Similarly, U.S. Pat. No. 4,804,007 discloses a megasonic transducer in which energy transmitting members comprised of quartz, sapphire, boron nitride, stainless steel or tantalum are glued to a piezoelectric crystal using epoxy.

It is also known that piezoelectric crystals can be bonded to certain materials using indium. For example, U.S. Pat. No. 3,590,467 discloses a method for bonding a piezoelectric crystal to a delay medium using indium where the delay medium comprises materials such as glasses, fused silica and glass ceramic.

In ultrasonic and megasonic cleaning systems, the crystal used in the transducer must be driven at a frequency that excites the natural anti-resonant frequency of the crystal in the chosen mode of operation, and which is compatible with the other components used in the transducer and the overall cleaning system. Furthermore, when the cleaning system is in operation, the driving or excitation frequency may need to be adjusted slightly because of temperature changes or other variations in the cleaning system. Many different techniques exist for tuning a transducer (i.e. for selecting and/or maintaining the excitation frequency). For example, prior art circuits that use a phase locked loop to make adjustments to the excitation frequency are known. However, such circuits are relatively complicated and include circuitry that must be added to the transducer system for the sole purpose of tuning the transducer. Most of these prior art systems also include hardware, such as a directional coupler and an analog to digital converter/sample hold circuit, for measuring the reflected and forward power. However, in the prior art these hardware components are not used for taking measurements that are utilized in a numerical method for tuning the transducer.

SUMMARY OF THE INVENTION

Briefly, the present invention is a method and apparatus for selecting the optimum frequency at which to drive the megasonic transducer in a megasonic cleaning system which does not require the use of a phase locked loop circuit. The method of the present invention uses a numerical method to tune the megasonic transducer. Furthermore, the raw data for the numerical method is generated by circuit components that are used in the cleaning system for purposes other than tuning the transducer. As used herein, the phrase "tuning the transducer" refers to the process of selecting the optimum excitation frequency at which to drive the megasonic transducer.

In the method of the present invention, a plurality of frequency values that span a frequency range containing an optimum frequency for driving a piezoelectric crystal are generated by a microprocessor. The reflection coefficient "ρ" at each of these frequency values is determined, where "ρ" is the reflected power divided by the forward power. This data is then fitted to a function using regression techniques to obtain the coefficients of the function. Using a third degree polynomial for the function works well in the technique.

The first derivative of the function is then calculated by the microprocessor and the roots of the first derivative equation are determined. The optimum frequency is selected from the set of roots, generally as the real root that is a minima within the examined frequency range. Variations of this method include using other functions in place of the third degree polynomial, and/or replacing the reflection coefficient with just the reflected power value.

The piezoelectric crystal used in the megasonic cleaning system is capable of generating acoustic energy in the frequency range of 10.0 KHz to 10.0 MHz when power is applied to the crystal. In a preferred embodiment, the attachment layer is comprised of indium and is positioned between the resonator and the piezoelectric crystal so as to attach the piezoelectric crystal to the energy transmitting member. A first adhesion layer comprised of chromium, copper and nickel is positioned in contact with a surface of the piezoelectric crystal. A first wetting layer comprised of silver is positioned between the first adhesion layer and the bonding layer for helping the bonding layer bond to the first adhesion layer. A second adhesion layer comprised of chromium, copper and nickel is positioned in contact with a surface of the resonator. A second wetting layer comprised of silver is positioned between the second adhesion layer and the bonding layer for helping the bonding layer bond to the second adhesion layer. Of course the method and apparatus for selecting the optimum frequency at which to drive the megasonic transducer can be used with other types of transducers, including transducers that do not have an indium layer.

DESCRIPTION OF THE PREFERRED EMBODIMENTS

Figure 1:
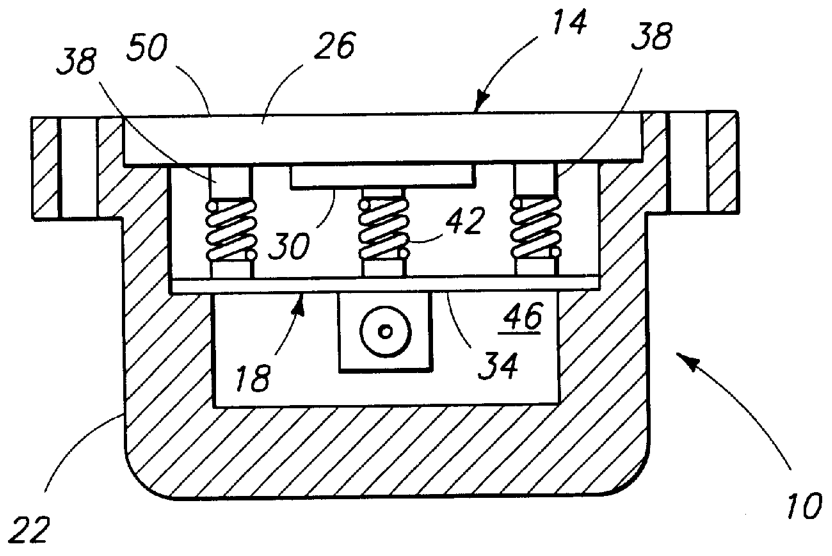
FIG. 1 is a cross-sectional view of an acoustic transducer assembly.

FIG. 1 illustrates a cross section of an acoustic transducer assembly 10 comprised of an acoustic transducer 14, a spring/button electrical connector board 18 and a housing 22. The transducer 14 comprises a resonator 26 which is bonded to a piezo crystal 30. The electrical connector board 18 comprises a printed circuit board (PCB) 34 which has a plurality of first spring/button connectors 38 and a plurality of second spring/button connectors 42 connected to it. The housing 22 is a case that encloses the electrical connector, board 18 so that it is protected from the environment. The electrical connector board 18 and the acoustic transducer 14 sit in a cavity 46 inside the housing 22.

The resonator 26 forms part of a wall in the housing 22 that covers and seals the cavity 46. A surface 50 of the resonator 26 forms an external side of the acoustic transducer assembly 10. In the preferred embodiment, the acoustic transducer 14 is used to generate megasonic acoustic energy in a cleaning apparatus used to clean semiconductor wafers. The surface 50 will be in contact with the cleaning fluid used in the cleaning apparatus.

Figure 2:
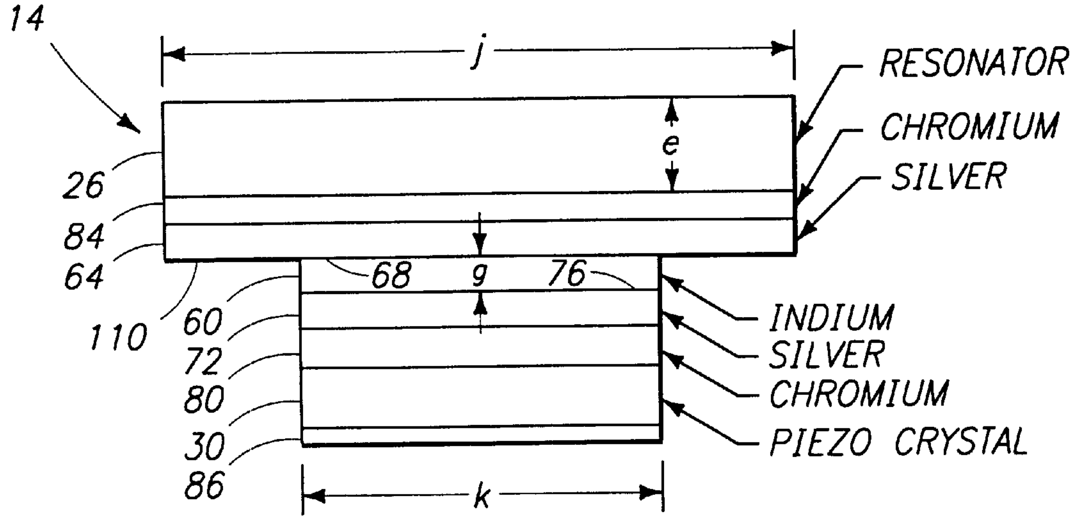
FIG. 2 is a side view of an acoustic transducer.

FIG. 2 illustrates that the acoustic transducer 14 comprises the piezoelectric crystal 30 attached to resonator 26 by an indium layer 60. In the preferred embodiment, a plurality of other layers are disposed between the piezoelectric crystal 30 and the resonator 26 to facilitate the attachment process. Specifically, a first metal layer 64 is present adjacent to a front surface 68 of the indium layer 60. A second metal layer 72 is present adjacent to a back surface 76 of the indium layer 60. A blocking layer 80 is positioned between the metal layer 72 and the piezoelectric crystal 30 to promote adhesion. In the preferred embodiment, the blocking layer 80 comprises a chromium-nickel alloy, and the metal layers 64 and 72 comprise silver. The blocking layer 80 has a minimum thickness of approximately 500 Å and the metal layer 72 has a thickness of approximately 500 Å.

In the preferred embodiment, the piezoelectric crystal 30 is comprised of lead zirconate titanate (PZT). However, the piezoelectric crystal 30 can be comprised of many other piezoelectric materials such as barium titanate, quartz or polyvinylidene fluoride resin (PVDF), as is well-known in the art. In the preferred embodiment, two rectangularly shaped PZT crystals are used in the transducer 14, and each PZT crystal is individually excited.

A blocking/adhesion layer 84 separates the metal layer 64 from the resonator 26. In the preferred embodiment, the blocking/adhesion layer 84 comprises a layer of nickel chromium alloy which is approximately 500 Å thick. However, other materials and/or thicknesses could also be used as the blocking layer 84. The function of the blocking layer 84 is to provide an adhesion layer for the metal layer 64. In the preferred embodiment, the metal layer 64 comprises silver and has a thickness of approximately 500 Å. However, other metals and/or thicknesses could be used for the metal layer 64. The function of the metal layer 64 is to provide a wetting surface for the molten indium.

An additional layer is also disposed on a back side of the piezoelectric crystal 30. Specifically, a metal layer 86 is positioned on the back side of the piezoelectric crystal 30 and covers substantially all of the surface area of the back side of the crystal 30. Generally, the layer 86 is applied to the piezoelectric crystal 30 by the manufacturer of the crystal. The layer 86 functions to conduct electricity from a set of the spring/button connectors shown in FIG. 1, so as to set up a voltage across the crystal 30. Preferably, the metal layer 86 comprises silver, nickel or another electrically conductive layer.

In the preferred embodiment, the indium layer 60 comprises pure indium (99.99%) such as is commercially available from Arconium or Indalloy. However, Indium alloys containing varying amounts of impurity metals can also be used, albeit with less satisfactory results. The benefit of using pure indium and its alloys is that indium possesses excellent shear properties that allow dissimilar materials with different coefficients of expansion to be attached together and experience thermal cycling without damage to the attached materials.

In the preferred embodiment, the resonator 26 is a piece of sapphire ($Al_2O_3$). Preferably, the sapphire is high grade having a designation of 99.999% (5,9s+purity). However, other materials, such as stainless steel, tantalum, aluminum, silica compounds, such as quartz, ceramics and plastics, can also function as the resonator 26. The purpose of the resonator 26 is to separate (isolate) the piezoelectric crystal 30 from the fluid used in the cleaning process, so that the fluid does not damage the crystal 30. Thus, the material used as the resonator 26 is usually dictated, at least in part, by the nature of the fluid. The resonator 26 must also be able to transmit the acoustic energy generated by the crystal 30 into the fluid. Sapphire is a desirable material for the resonator 26 when the items to be cleaned by the megasonic cleaning apparatus require parts per trillion purity. For example, semiconductor wafers require this type of purity.

In the preferred embodiment, the resonator 26 has a thickness "e" which is preferably a multiple of one-half of the wavelength of the acoustic energy emitted by the piezoelectric crystal 30, so as to minimize reflectance problems. For example, "e" is approximately six millimeters for sapphire and acoustic energy of about 925 KHz.

Figure 3:
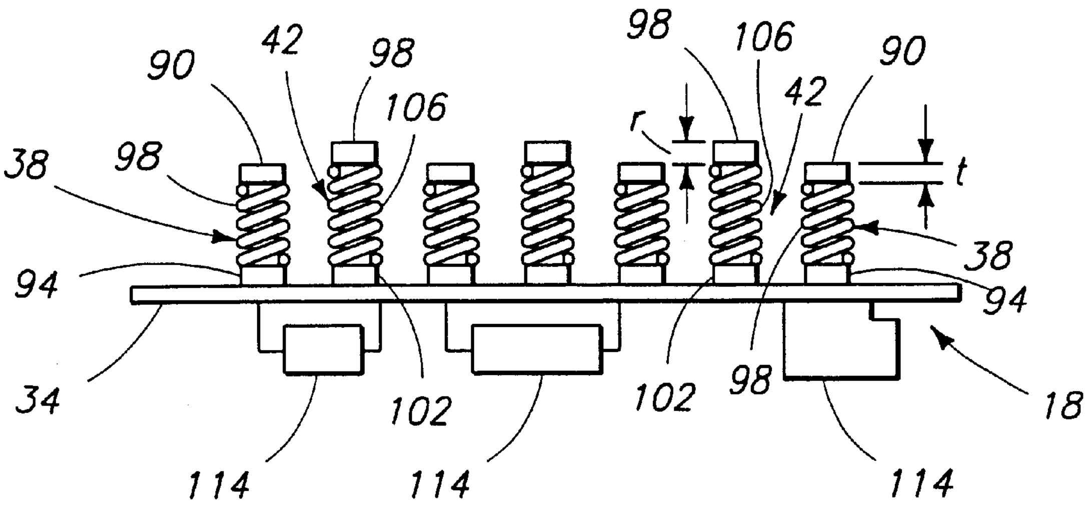
FIG. 3 is side view of a spring/button electrical connector board used with a megasonic transducer.

FIG. 3 illustrates the spring/button electrical connector board 18 in more detail. Each first spring/button connector 38 comprises an upper silver button 90 and a lower silver button 94. The upper silver button 90 and the lower silver button 94 are attached to a plated silver spring 98 and soldered to the printed circuit board (PCB) 34 so that the connector 38 can provide an electrical connection to the acoustic transducer 14. The upper silver button 90 has a thickness "t" of about 0.15 inches.

Similarly, each second spring/button connector 42 comprises an upper silver button 98 and a lower silver button 102. The upper silver button 98 and the lower silver button 102 are attached to a silver plated spring 106 and soldered to the PCB 34 so that the connector 42 can provide an electrical connection to the acoustic transducer 14. The upper silver button 98 has a thickness "r" of about 0.10 inches. Generally, the thickness "t" is greater than the thickness "r" because the first spring/button connector 38 has extend farther up to make contact with the acoustic transducer 14 than does the second spring/button connector 42 (see FIGS. 1 and 2).

A radio frequency (RF) generator provides a voltage to the PCB 34. The PCB 34 includes electrical connections to the spring/button connectors 38 and 42 so that the polarity of the spring/button connectors 38 is positive and the polarity of the spring/button connectors 42 is negative, or vice versa. Examination of FIG. 2 shows that in the acoustic transducer 14, the layers 26, 84 and 64 have a greater length "j" than the length "k" of the layers 60, 72, 80, 30 and 86.

This creates a step-region 110 on the silver layer 64 that can be contacted by the upper buttons 90 of the spring/button connectors 38. The upper buttons 98 of the spring/button connectors 42 make electrical contact with the silver layer 86.

The purpose of the spring/button connectors 38 and 42 is to create a voltage difference across the piezoelectric crystal 30 so as to excite it at the frequency of the RF voltage supplied by the RF generator. The connectors 38 connect the metal layer 64 to the RF generator. The connectors 42 connect the layer 86 to the RF generator. The RF generator delivers a RF alternating current to the piezoelectric crystal 30 via the connectors 38 and 42. In one embodiment, this is a 925 KHz signal, at 600 watts of power. The effective power in the piezoelectric crystal 30 is approximately 15.5 watts/$cm^2$. The effective power in the piezoelectric crystal 30 is defined as the forward power into the crystal 24 minus the reflected power back into the RF generator. Thus, the step-region 110, and the spring/button connectors 38 and 42, allow a voltage to be set up across the piezoelectric crystal 30 without the need for soldering discrete leads to the layers 64 and 86.

In FIG. 3, a plurality of electrical components 114, such as capacitors and/or inductors, are shown. These are used to balance the impedance between the RF input and the spring output.

Figure 4:
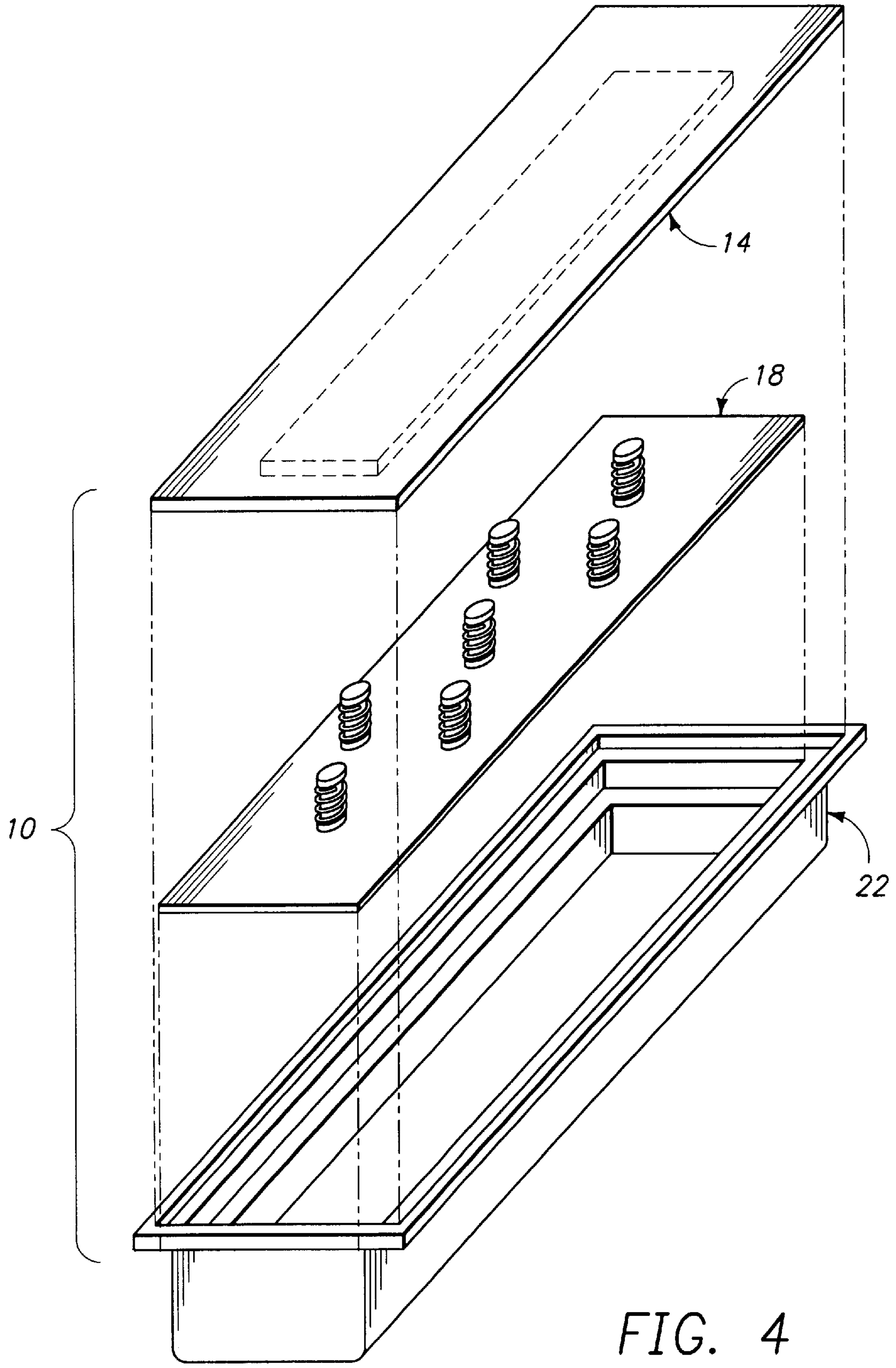
FIG. 4 is an exploded view of an acoustic transducer.

FIG. 4 illustrates the way the acoustic transducer 14, the spring/button electrical connector board 18 and the housing 22 fit together to form the acoustic transducer assembly 10.

The acoustic transducer 14 is prepared as follows (using the preferred materials described previously): Assuming that the resonator 26 is sapphire, the surface of the sapphire that will be adjacent to the layer 84 is cleaned by abrasive blasting or chemical or sputter etching. The blocking/adhesion layer 84 is then deposited on the resonator 26 by physical vapor deposition ("PVD"), such as argon sputtering. A plating technique could also be used. The silver layer 64 is then deposited on the chromium blocking/adhesive layer 84 using argon sputtering. A plating technique could also be used.

The piezoelectric crystal 30 is usually purchased with the layers 86 already applied to it. The blocking layer 80 and the metal layer 72 are deposited on the crystal 30 by plating or physical vapor deposition.

The resonator 26 and the piezoelectric crystal 30 are both heated to approximately 200° C., preferably by placing the resonator 26 and the crystal 30 on a heated surface such as a hot-plate. When both pieces have reached a temperature of greater than 160° C., solid indium is rubbed on the surfaces of the resonator 26 and the crystal 30 which are to be attached. Since pure indium melts at approximately 157° C., the solid indium liquefies when it is applied to the hot surfaces, thereby wetting the surfaces with indium. It is sometimes advantageous to add more indium at this time by using the surface tension of the indium to form a "puddle" of molten indium.

The resonator 26 and the piezoelectric crystal 30 are then pressed together so that the surfaces coated with indium are in contact with each other, thereby forming the transducer 14. The newly formed transducer 14 is allowed to cool to room temperature so that the indium solidifies. Preferably, the solid indium layer has a thickness "g" which is just sufficient to form a void free bond (i.e. the thinner the better). In the preferred embodiment, "g" is approximately one mil (0.001 inches). Thicknesses up to about 0.01 inches could be used, but the efficiency of acoustic transmission drops off when the thickness "g" is increased.

Preferably, the transducer 14 is allowed to cool with the piezoelectric crystal 30 on top of the resonator 26 and the force of gravity holding the two pieces together. Alternatively, a weight can be placed on top of the piezoelectric crystal 30 to aide in the bonding of the indium. Another alternative is to place the newly formed transducer 14 in a clamping fixture.

Once the transducer 14 has cooled to room temperature, any excess indium that has seeped out from between the piezoelectric crystal 30 and the resonator 26, is removed with a tool or other means.

Figure 5:
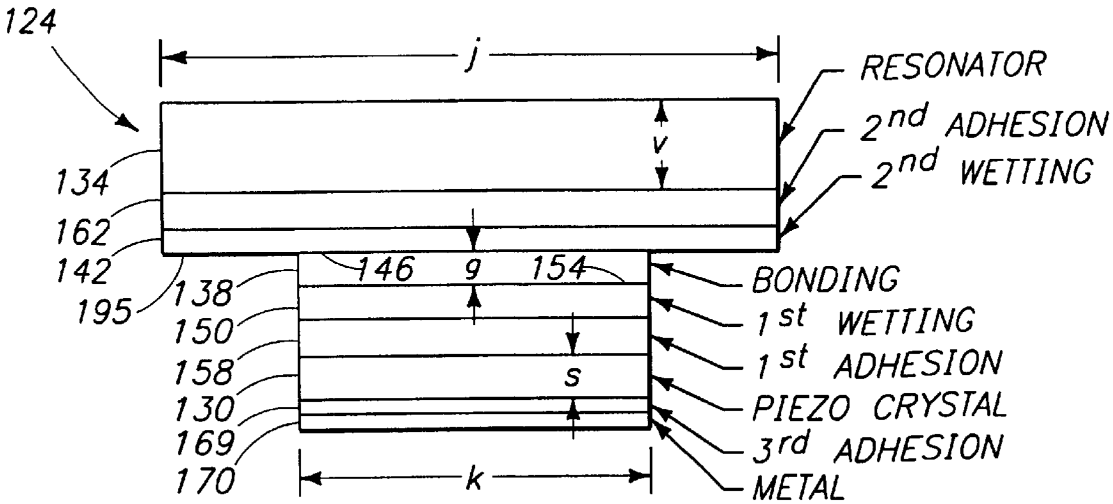
FIG. 5 is a side view of another acoustic transducer.

FIG. 5 illustrates a preferred embodiment of an acoustic transducer system 124 in which the resonator can be one of several chemically inert materials. These materials include sapphire, quartz, silicon carbide, silicon nitride and ceramics. The transducer system 124 shown in FIG. 5 is similar to the transducer 14 shown in FIG. 2. However, several of the attachment layers used in the transducer system 124 are different.

In FIG. 5, the acoustic transducer system 124 comprises a piezoelectric crystal 130 attached to a resonator 134 by a bonding layer 138. A plurality of attachment layers are disposed between the piezoelectric crystal 130 and the resonator 134 to facilitate the attachment process. Specifically, a second wetting layer 142 is present adjacent to a front surface 146 of the bonding layer 138. A first wetting layer 150 is present adjacent to a back surface 154 of the bonding layer 138. A first adhesion layer 158 is positioned between the first wetting layer 150 and the piezoelectric crystal 130 to facilitate the mechanical adhesion of the bonding layer 138 to the crystal 130.

In the preferred embodiment, the first adhesion layer 158 comprises an approximately 5000 Å thick layer of an alloy comprised of chrome and a nickel copper alloy, such as the alloys marketed under the trademarks Nickel 400™ or MONEL™. However, other materials and/or thicknesses could also be used as the first adhesion layer 158. Nickel 400™ and MONEL™ are copper nickel alloys comprised of 32% copper and 68% nickel.

Preferably, the wetting layers 142 and 150 comprise silver. The wetting layers 142 and 150 each have a thickness of approximately 5000 Å. However, other metals and/or thicknesses could be used for the wetting layers 142 and 150. The function of the wetting layers 142 and 150 is to provide a wetting surface for the molten indium, meaning that the layers 142 and 150 help the bonding (indium) layer 138 adhere to the first adhesion layer 158 and a second adhesion layer 162, respectively. It is thought that the silver in the wetting layers 142 and 150 forms an alloy with the indium, thereby helping the bonding layer 138 adhere to the adhesion layers 158 and 162. The transducer system 124 includes a step-region 195 in the wetting layer 142 which is exactly analogous to the step-region 110 described previously with respect to FIG. 2.

In the preferred embodiment, the piezoelectric crystal 130 is identical to the piezoelectric crystal 30 already described, and is comprised of lead zirconate titanate (PZT). However, many other piezoelectric materials such as barium titanate, quartz or polyvinylidene fluoride resin (PVDF), may be used as is well-known in the art. In the preferred embodiment, four rectangularly shaped PZT crystals are used in the transducer 14 (shown in FIG. 6), and each PZT crystal is individually excited. However, other numbers of the crystals 130 can be used, including between one and sixteen of the crystals 130, and other shapes, such as round crystals, could be used.

The second adhesion layer 162 separates the second wetting layer 142 from the resonator 134. In the preferred embodiment, the adhesion layer 162 comprises an approximately 5000 Å thick layer of an alloy comprised of chrome and a nickel copper alloy, such as the alloys marketed under the trademarks Nickel 400™ or MONEL™. However, other materials and/or thicknesses could also be used as the second adhesion layer 162.

The function of the first adhesion layer 158 is to form a strong bond between the bonding (indium) layer 138 and the piezoelectric crystal 130. As noted previously, the wetting layer 150 forms an alloy with the indium in the bonding layer 138, thereby permitting the adhesion layer 158 to bond with the bonding layer 138. Similarly, the function of the second adhesion layer 162 is to form a strong bond between the bonding (indium) layer 138 and the resonator 134. The wetting layer 142 forms an alloy with the indium in the bonding layer 138, thereby permitting the adhesion layer 162 to bond with the bonding layer 138. Additionally, the first adhesion layer 158 needs to be electrically conductive in order to complete the electrical path from the step region 195 to the surface of the piezoelectric crystal 130. Furthermore, the adhesion layers 158 and 162 may prevent (block) the indium in the bonding layer 138 from reacting with the crystal 130 and/or the resonator 134, respectively.

An additional two layers are disposed on a back side of the piezoelectric crystal 130 (i.e. on the side facing away from the resonator 134). Specifically, a third adhesion layer 169 and a metal layer 170 are positioned on the back side of the piezoelectric crystal 130. The layers 169 and 170 cover substantially all of the surface area of the back side of the crystal 130. In the preferred embodiment, the third adhesion layer 169 comprises an approximately 5000 Å thick layer of an alloy comprised of chrome and a nickel copper alloy, such as the alloys marketed under the trademarks Nickel 400™ or MONEL™. However, other materials and/or thicknesses could also be used as the third adhesion layer 169. The function of the third adhesion layer 169 is to promote adhesion of the metal layer 170 to the crystal 130.

Preferably, the metal layer 170 comprises silver, although other electrically conductive metals such as nickel could also be used. Generally, the crystal 130 is obtained from commercial sources without the layers 169 and 170. The layers 169 and 170 are then applied to the piezoelectric crystal 130 using a sputtering technique such as physical vapor deposition (PVD). The layer 170 functions as an electrode to conduct electricity from a set of the spring/button connectors shown in FIG. 1, so as to set up a voltage across the crystal 130. Since the third adhesion layer 169 is also electrically conductive, both of the layers 169 and 170 actually function as an electrode.

In the preferred embodiment, the bonding layer 138 comprises pure indium (99.99%) such as is commercially available from Arconium or Indalloy. However, indium alloys containing varying amounts of impurity metals can also be used, albeit with less satisfactory results. The benefit of using indium and its alloys is that indium possesses excellent shear properties that allow dissimilar materials with different coefficients of expansion to be attached together and experience thermal cycling (i.e. expansion and contraction at different rates) without damage to the attached materials or to the resonator 34. The higher the purity of the indium, the better the shear properties of the system 124 will be. If the components of the acoustic transducer system 124 have similar coefficients of expansion, then less pure indium can be used because shear factors are less of a concern. Less pure indium (i.e. alloys of indium) has a higher melting point then pure indium and thus may be able to tolerate more heat.

Depending upon the requirements of a particular cleaning task, the composition of the resonator 134 is selected from a group of chemically inert materials. For example, inert materials that work well as the resonator 134 include sapphire, quartz, silicon carbide, silicon nitride and ceramics. One purpose of the resonator 134 is to separate (isolate) the piezoelectric crystal 130 from the fluid used in the cleaning process, so that the fluid does not damage the crystal 130. Additionally, it is unacceptable for the resonator 134 to chemically react with the cleaning fluid. Thus, the material used as the resonator 134 is usually dictated, at least in part, by the nature of the cleaning fluid. Sapphire is a desirable material for the resonator 134 when the items to be cleaned by the megasonic cleaning apparatus require parts per trillion purity. For example, semiconductor wafers require this type of purity. A hydrogen fluoride (HF) based cleaning fluid might be used in a cleaning process of this type for semiconductor wafers.

The resonator 134 must also be able to transmit the acoustic energy generated by the crystal 130 into the fluid. Therefore, the acoustic properties of the resonator 134 are important. Generally, it is desirable that the acoustic impedance of the resonator 134 be between the acoustic impedance of the piezoelectric crystal 130 and the acoustic impedance of the cleaning fluid in the fluid chamber 190 (shown in FIG. 6). Preferably, the closer the acoustic impedance of the resonator 134 is the acoustic impedance of the cleaning fluid, the better.

In one preferred embodiment, the resonator 134 is a piece of synthetic sapphire (a single crystal substrate of $Al_2O_3$). Preferably, the sapphire is high grade having a designation of 99.999% (5 9s+purity). When synthetic sapphire is used as the resonator 134, the thickness "v", illustrated in FIG. 5 is approximately six millimeters. It should be noted that other forms of sapphire could be used as the resonator 134, such as rubies or emeralds. However, for practical reasons such as cost and purity, synthetic sapphire is preferred. Additionally, other values for the thickness "v" can be used.

In the preferred embodiment, the thickness "v" of the resonator 134 is a multiple of one-half of the wavelength of the acoustic energy emitted by the piezoelectric crystal 130, so as to minimize reflectance problems. For example, "v" is approximately six millimeters for sapphire and acoustic energy of approximately 925 KHz. The wavelength of acoustic energy in the resonator 134 is governed by the relationship shown in equation 1 below:

$$\lambda = v_L/2f \qquad (1)$$

where, $v_L$=the velocity of sound in the resonator 134 (in mm/msec), f=the natural frequency of the piezoelectric crystal 130 (in MHz)

λ=the wavelength of acoustic energy in the resonator 134.

From equation 1, it follows that when the composition of the resonator changes or when the natural resonance frequency of the crystal 130 changes, the ideal thickness of the resonator 134 will change. Therefore, in all of the examples discussed herein, a thickness "v" which is a multiple of one-half of the wavelength λ could be used.

In another preferred embodiment, the resonator 134 is a piece of quartz ($SiO_2$-synthetic fused quartz). Preferably, the quartz has a purity of 99.999% (5 9s+purity). When quartz is used as the resonator 134, the thickness "v", illustrated in FIG. 5 is approximately three to six millimeters.

In another preferred embodiment, the resonator 134 is a piece of silicon carbide (SiC). Preferably, the silicon carbide has a purity of 99.999% (5 9s+purity, semiconductor grade). When silicon carbide is used as the resonator 134, the thickness "v", illustrated in FIG. 5 is approximately six millimeters.

In another preferred embodiment, the resonator 134 is a piece of silicon nitride. Preferably, the silicon nitride has a purity of 99.999% (5 9s+purity, semiconductor grade). When silicon nitride is used as the resonator 134, the thickness "v", illustrated in FIG. 5 is approximately six millimeters.

In another preferred embodiment, the resonator 134 is a piece of ceramic material. In this application, the term ceramic means alumina ($Al_2O_3$) compounds such as the material supplied by the Coors Ceramics Company under the designation Coors AD-998. Preferably, the ceramic material has a purity of at least 99.8% $Al_2O_3$. When ceramic material is used as the resonator 134, the thickness "v", illustrated in FIG. 5 is approximately six millimeters.

The acoustic transducer system 124 illustrated in FIG. 5 is prepared by the following method: Assuming that the resonator 134 is sapphire, the surface of the sapphire that will be adjacent to the adhesion layer 162 is cleaned by abrasive blasting or chemical or sputter etching. The adhesion layer 162 is then deposited on the resonator 134 using a physical vapor deposition ("PVD") technique, such as argon sputtering. More specifically, the chrome and nickel copper alloy (e.g. Nickel 400™ or MONEL™) that comprise the layer 162 are co-sputtered onto to the resonator 134 so that the layer 162 is comprised of approximately 50% chrome and 50% nickel copper alloy. The wetting (silver) layer 142 is then deposited on the adhesion layer 162 using argon sputtering. A plating technique could also be used in this step.

The piezoelectric crystal 130 is preferably purchased without any electrode layers deposited on its surfaces. The third adhesion layer 169 is then deposited on the crystal 130 using a PVD technique, such as argon sputtering. More specifically, the chrome and nickel copper alloy that comprise the layer 169 are co-sputtered onto to the crystal 130 so that the layer 169 is comprised of approximately 50% chrome and 50% nickel copper alloy (e.g. Nickel 400™ or MONEL™). The electrode (silver) layer 170 is then deposited on the adhesion layer 169 using argon sputtering. A plating technique could also be used in this step.

Similarly, the first adhesion layer 158 is deposited on the opposite face of the crystal 130 from the third adhesion layer 169 using a PVD technique like argon sputtering. More specifically, the chrome and nickel copper alloy that comprise the layer 158 are co-sputtered onto to the crystal 130 so that the layer 158 is comprised of approximately 50% chrome and 50% nickel copper alloy. The wetting (silver) layer 150 is then deposited on the adhesion layer 158 using argon sputtering. A plating technique could also be used in this step.

The resonator 134 and the piezoelectric crystal 130 are both heated to approximately 200° C., preferably by placing the resonator 134 and the crystal 130 on a heated surface such as a hot-plate. When both pieces have reached a temperature of greater-than 160° C., solid indium is rubbed on the surfaces of the resonator 134 and the crystal 130 which are to be attached. Since pure indium melts at approximately 157° C., the solid indium liquefies when it is applied to the hot surfaces, thereby wetting the surfaces with indium. It is sometimes advantageous to add more indium at this time by using the surface tension of the indium to form a "puddle" of molten indium.

The resonator 134 and the piezoelectric crystal 130 are then pressed together so that the surfaces coated with indium are in contact with each other, thereby forming the transducer system 124. The newly formed transducer system 124 is allowed to cool to room temperature so that the indium solidifies. Preferably, the bonding (indium) layer 138 has a thickness "g" which is just sufficient to form a void free bond. In the preferred embodiment, "g" is approximately one mil (0.001 inches). It is thought that the thickness "g" should be as small as possible in order to maximize the acoustic transmission, so thicknesses less than one mil might be even more preferable. Thicknesses up to about 0.01 inches could be used, but the efficiency of acoustic transmission drops off when the thickness "g" is increased.

Preferably, the transducer system 124 is allowed to cool with the piezoelectric crystal 130 on top of the resonator 134 and the force of gravity holding the two pieces together. Alternatively, a weight can be placed on top of the piezoelectric crystal 130 to aide in the bonding of the indium. Another alternative is to place the newly formed transducer system 124 in a clamping fixture.

Once the transducer system 124 has cooled to room temperature, any excess indium that has seeped out from between the piezoelectric crystal 130 and the resonator 134, is removed with a tool or other means.

Figure 6:
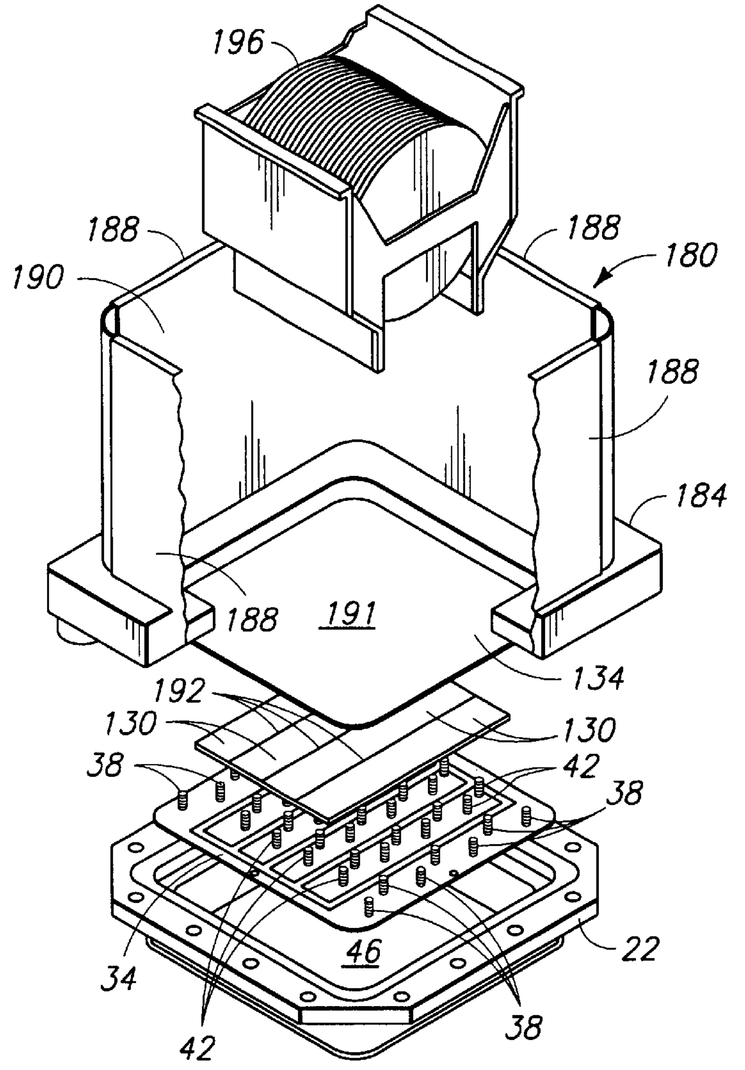
FIG. 6 is an exploded view of a megasonic cleaning system.

FIG. 6 illustrates a megasonic cleaning system 180 that utilizes the acoustic transducer system 124 (or the acoustic transducer 14). The cleaning solution is contained within a tank 184. In the preferred embodiment, the tank 184 is square-shaped and has four vertical sides 188. The resonator 134 forms part of the bottom surface of the tank 184. Other shapes can be used for the tank 184, and in other embodiments, the resonator 134 can form only a portion of the bottom surface of the tank 184.

A fluid chamber 190 is the open region circumscribed by the sides 188. Since the sides 188 do not cover the top or bottom surfaces of the tank 184, the sides 188 are said to partially surround the fluid chamber 190. The fluid chamber 190 holds the cleaning solution so the walls 188 and the resonator 134 must make a fluid tight fit to prevent leakage. The resonator 134 has an interface surface 191 which abuts the fluid chamber 190 so that the interface surface 134 is in contact with at least some of the cleaning solution when cleaning solution is present in the fluid chamber 190. Obviously, the interface surface 191 is only in contact with the cleaning solution directly adjacent to the surface 191 at any point in time.

In the preferred embodiment shown in FIG. 6, four piezoelectric crystals 130 are used. In a typical preferred embodiment, each of the crystals is a rectangle having dimensions of 1 inch (width)×6 inch (length "k" in FIG. 5)×0.10 inch (thickness "s" in FIG. 5). Since the natural frequency of the crystal changes with thickness, reducing the thickness will cause the natural frequency of the crystal to be higher. As was indicated previously, other numbers of crystals can be used, other shapes for the crystals can be used and the crystals can have other dimensions such as 1.25×7×0.10 inches or 1.5×8×0.10 inches. Each of the crystals 130 are attached to the resonator 134 by the plurality of layers described previously with respect to FIG. 5. A gap 192 exists between each adjacent crystal 130 to prevent coupling of the crystals.

Figure 7:
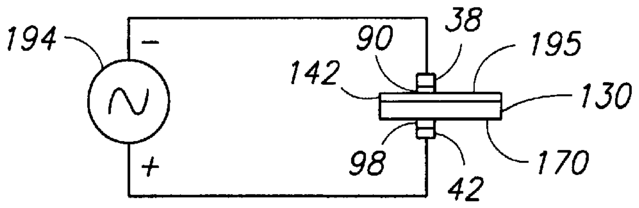
FIG. 7 is a schematic circuit diagram of the power system used to drive a megasonic transducer.

The power for driving the crystals 130 is provided by a radiofrequency (RF) generator 194 (shown in FIG. 7). The electrical connections between the RF generator 194 and the crystals 130 are provided by the plurality of first spring/button connectors 38 and the plurality of second spring/button connectors 42, as was explained previously with respect to FIGS. 1 and 3. The plurality of second spring/ button connectors 42 provide the active connection to the RF generator 194 and the plurality of first spring/button connectors 38 provide the ground connection to the RF generator 194.

The transducer system 124 includes the step-region 195 (shown in FIG. 5) which is exactly analogous to the step-region 110 described previously with respect to FIG. 2. The step region 195 is a region on the second wetting layer 142 that can be contacted by the upper buttons 90 of the spring/button connectors 38. Since all of the layers between the second wetting layer 142 and the crystal 130 are electrically conductive (i.e. the layers 138, 150 and 158), contact with the step region 195 is equivalent to contact with the surface front surface of the crystal 130. The upper buttons 98 of the spring/button connectors 42 make electrical contact with the metal layer 170 to complete the circuit for driving the PZT crystal 130. This circuit is represented schematically in FIG. 7.

Referring to FIG. 6, the printed circuit board (PCB) 34 and the piezoelectric crystal 130 are positioned in a cavity 46 and are surrounded by the housing 22 as was described previously with respect to FIG. 1. A plurality of items 196 to be cleaned are inserted through the top of the tank 184.The acoustic transducer system 124 (illustrated in FIG. 5) functions as described below. It should be noted that the transducer 14 (illustrated in FIG. 2) works in the same manner as the acoustic transducer system 124. However, for the sake of brevity, the components of the system 124 are referenced in this discussion.

A radiofrequency (RF) voltage supplied by the RF generator 194 creates a potential difference across the piezoelectric crystal 130. Since this is an AC voltage, the crystal 130 expands and contracts at the frequency of the RF voltage and emits acoustic energy at this frequency. Preferably, the RF voltage applied to the crystal 130 has a frequency of approximately 925 KHZ. However, RF voltages in the frequency range of approximately 10.0 KHz to 10.0 MHZ can be used with the system 124, depending on the thickness and natural frequency of the crystal 130. A 1000 watt RF generator such as is commercially available from Dressler Industries of Strohlberg, Germany is suitable as the RF generator 194.

In the preferred embodiment, only one of the crystals 130 is driven by the RF generator at a given time. This is because each of the crystals 130 have different natural frequencies. In the preferred embodiment, the optimum frequency at which to drive the transducer system 124 is determined and stored in software, as is explained below with respect to FIG. 8. The RF generator then drives the first crystal at the frequency indicated by the software for the first crystal. After a period of time (e.g. one millisecond), the RF generator 194 stops driving the first crystal and begins driving the second crystal at the frequency indicated by the software for the second crystal 130. This process is repeated for each of the plurality of crystals. Alternatively, the natural frequencies for the various crystals 130 can be approximately matched by adjusting the geometry of the crystals, and then driving all of the crystals 130 simultaneously. It should be noted that each of the crystals 130 needs a separate connector board 18 (shown in FIG. 3), so that the individual crystal 130 can be driven by the RF generator 194 without driving the other crystals 130.

Most of the acoustic energy is transmitted through all of the layers of the system 124 disposed between the crystal 130 and the resonator 124, and is delivered into the cleaning fluid. However, some of the acoustic energy generated by the piezoelectric crystal 130 is reflected by some or all of these layers. This reflected energy can cause the layers to heat up, especially as the power to the crystal is increased.

In the present invention, the bonding layer 138 has an acoustic impedance that is higher than the acoustic impedance of other attachment substances, such as epoxy. This reduces the amount of reflected acoustic energy between the resonator 134 and the bonding layer 138. This creates two advantages in the present invention. First, less heat is generated in the transducer system, thereby allowing more RF power to be applied to the piezoelectric crystal 130. For example, in the transducer system illustrated in FIG. 5, 25 to 30 watts/cm$^2$ can be applied to the crystal 130 (for an individually excited crystal) without external cooling. Additionally, the system 124 can be run in a continuous mode without cooling (e.g. 30 minutes to 24 hours or more), thereby allowing better cleaning to be achieved. In contrast, prior art systems use approximately 7 to 8 watts/cm$^2$, without external cooling. Prior art megasonic cleaning systems that operate at powers higher than 7 to 8 watts/cm$^2$ in a continuous mode require external cooling of the transducer.

Second, in the present invention, the reduced reflectance allows more power to be delivered into the fluid, thereby reducing the amount of time required in a cleaning cycle. For example, in the prior art, a cleaning cycle for sub 0.5 micron particles generally requires fifteen minutes of cleaning time. With the present invention, this time is reduced to less than one minute for many applications. In general, the use of the bonding (indium) layer 138 permits at least 90 to 98% of the acoustic energy generated by the piezoelectric crystal 130 to be transmitted into the cleaning fluid when the total power inputted to the piezoelectric crystal 130 is in the range of 400 to 1000 watts (e.g. 50 watts/cm$^2$ for a crystal 130 having an area of 20 cm$^2$). In the preferred embodiment, the bonding (indium) layer 138 attenuates the acoustic energy that is transmitted into the volume of cleaning fluid by no more than approximately 0.5 dB. It is believed that the system 124 can be used with power as high as 5000 watts. In general, the application of higher power levels to the piezoelectric crystal 130 results in faster cleaning times. It may also lead to more thorough cleaning.

Table 1 below indicates the power levels that can be utilized when the indicated materials are used as the resonator 134 in the system 124. The input wattage (effective power) is defined as the forward power into the crystal 130 minus the reflected power back into the RF generator 194. As indicated above, the system 124 allows at least approximately 90 to 98% of the input wattage to be transmitted into the cleaning solution.

TABLE 1

| Resonator | Input Wattage/cm$^2$ |
|---|---|
| Quartz | 12.5 watts/cm$^2$ |
| Silicon carbide or silicon nitride | 20 watts/cm$^2$ |
| Stainless steel | 25 watts/cm$^2$ |
| Ceramic | 40 watts/cm$^2$ |
| Sapphire | 50 watts/cm$^2$ |

Figure 8:
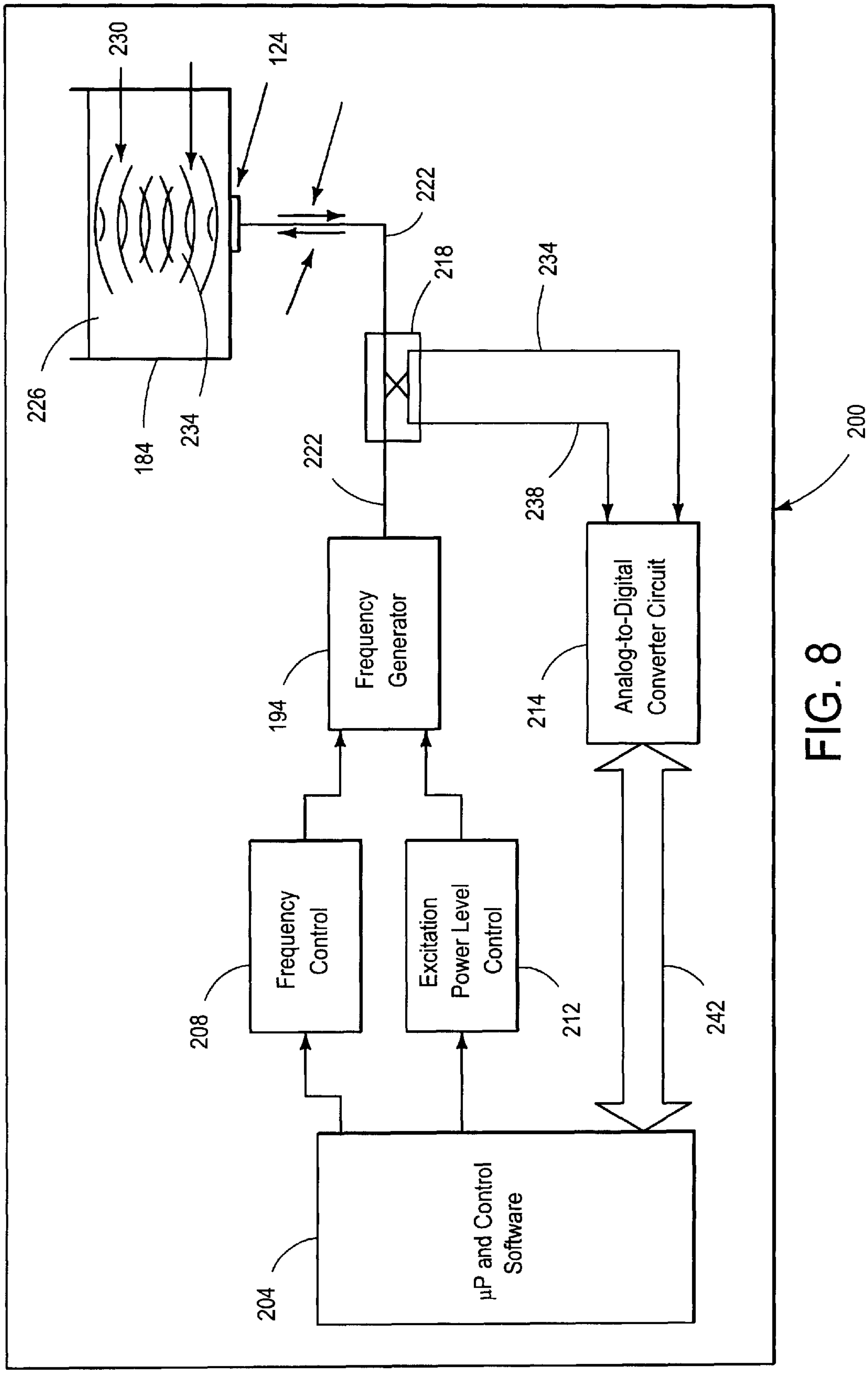
FIG. 8 is a schematic diagram of a transducer tuning system according to the present invention.

FIG. 8 illustrates a system 200 which is used for determining the optimum frequency at which to drive the transducer system 124. Of course, the system and method described below are not limited to use with a megasonic transducer having an indium attachment layer. The system and method can be used with many types of megasonic transducers, such as the transducers described in the prior art. Preferrably, the transducer system 124 is tuned once at the beginning of a cleaning cycle. However, in other embodiments, the transducer system 124 could be re-tuned during a cleaning cycle.

In the system 200, a microprocessor 204, a frequency control circuit 208, an excitation power level control circuit 212 and the frequency generator 194 are electrically connected to a directional coupler/detector 218 by a transmission line 222, such as a coaxial cable. The transmission line 222 is also electrically connected to the transducer system 124. The transducer system 124 is positioned to deliver acoustic energy into a fluid 226 (i.e. the cleaning solution) contained in the tank 184, as was explained previously with respect to FIG. 6.

An analog to digital converter circuit 214 is connected to the microprocessor 204 by a data bus 242. In the preferred embodiment, the analog to digital converter 214 circuit comprises two A/D converters and two synchronous sample /hold circuits, as is described later. Preferably, the microprocessor 204, the circuits 208, 212 and 214 are all positioned on the same circuit board. Software running on the microprocessor 204 controls the processes described below. In the preferred embodiment, the microprocessor 204 comprises thirty-two bit microprocessor running at forty MHz, such as the Coldfire™ microprocessor available from Motorola. As used herein, no distinction is made between the words microprocessor and microcontroller.

The data collected with the system 200 is used to calculate the optimum frequency for driving the transducer system 124 using the following method. Of course the method and apparatus for selecting the optimum frequency at which to drive the megasonic transducer can be used with other types of transducers, including transducers that do not have an indium layer. Initially, a frequency range for the crystal 130 is estimated. Preferably, this estimation is made by making impedance plots of the crystal 130 in free air (i.e. plot impedance vs. frequency). This is done using commercially available impedance measuring equipment, not the system 200. The antiresonant frequency for the crystal 130 is the point of maximum impedance. In the preferred embodiment a frequency range of a few tens of kilohertz on each side of the antiresonant frequency is selected. For example, the range may be 900 to 950 KHz where the antiresonant frequency of the crystal 130 is somewhere in the approximate middle of this range. Once the frequency range has been determined, the upper and lower frequency limits for the range are entered in the software running on the microprocessor 204.

Next, a plurality of frequencies $F_N$ within the frequency range are selected. The number of frequencies N within the frequency range may be adjusted up or down according to how well-behaved the system 200 is. Disturbances from many sources will influence the number N. In any practical implementation, the number N will be determined empirically, but it must always be greater than the degree of the polynomial model (discussed below) plus one, and N is always a positive integer greater than or equal to two. In the preferred embodiment, N is thirty, and this value is programmed into the software running on the microprocessor 204. Preferably, the N frequencies are equally spaced, but they do not have to be.

Next, the reflection coefficient "ρ" is determined at each of the N frequencies. The reflection coefficient "ρ" is defined as the reflected power ($P_{Refl}$) divided by the forward power ($P_{Fwd}$). The reflected power and the forward power are measured by the technique described below. These measurements result in a set of ordered pairs of data points (ρ, ω) for each of the N frequencies, where ω=2πf (i.e. "ω" is the frequency in radians; "f" is an individual frequency from the set $F_N$).

The set of ordered pairs (ρ, ω) are then fit to a polynomial using standard polynomial regression techniques. Typically it is found that a polynomial of degree three provides the best results. However, polynomials of other degrees may be better suited for other implementations. The third degree polynomial is represented by equation 2.

$$f(\omega)=A\omega^3+B\omega^2+C\omega+D \quad (2)$$

The values of the coefficients A, B, C and D are obtained from the polynomial regression. The first derivative of equation 2 is taken to yield equation 3.

$$f(\omega)=3A\omega^2+2B\omega+C \quad (3)$$

The optimum frequency ($\omega_{opt}$) is calculated by setting equation 3 equal to zero, substituting in the known values of the coefficients A, B and C derived from equation 2, and then determining $\omega_{opt}$ by finding the roots of equation 3, such as by using the quadratic equation. In this example, there can only be two roots. The real root that is a minima in the frequency range selected at the beginning of the process is selected as the optimum frequency ($\omega_{opt}$).

The reflected power and the forward power used to calculate the reflection coefficient "ρ" are measured using the system 200 illustrated in FIG. 8. Specifically, the microprocessor 204 includes software that causes the frequency control circuit 208 to generate a first frequency control signal for the frequency generator 194. The first frequency control signal causes the frequency generator 194 to generate an RF signal at a first frequency $N_1$. The frequency $N_1$ is one of the N frequencies originally chosen to span the estimated frequency range. The microprocessor 204 also includes software that causes the excitation power level control circuit 212 to generate a power control signal for driving the frequency generator 194 at the desired power level (e.g. the power levels listed in Table 1).

The frequency generator 194 then generates an RF excitation signal at the frequency and power instructed by the frequency and power control signals. The excitation signal travels over the transmission line 222 to the crystal 130 and causes the transducer system 124 to emit acoustic energy at the operating frequency (illustrated as a plurality of incident acoustic waves 230) into the fluid 226. Acoustic energy from the waves 230 is reflected by a multitude of reflection points such as the walls of the tank 184, the interface between the fluid 226 and the ambient atmosphere and density changes within the fluid 226. This reflected acoustic energy is represented by a plurality of reflected acoustic waves 234. A primary goal of the method of the present invention is to find a frequency that excites the natural anti-resonant frequency of the crystal 130 and which minimizes the reflected acoustic energy.

The transmission line 222 carries both the RF excitation signal and an RF reflected signal. The RF reflection signal is mainly the electrical energy reflected back from the transducer system 124. The main source of these reflected signals are reflections of the excitation signal as it traverses the layers 170, 169, 130, 158, 150, 138, 142, 162 and 134 of the system 124 (shown in FIG. 5). However, the RF reflection signal is also distorted by the reflected acoustic waves 234, and several lesser sources. In any event, the RF reflection signal is a signal of interest and it is measured by the directional coupler/detector 218.

The directional coupler/detector 218 is a device capable of separating the RF excitation signal from the RF reflection signal. Preferably, the coupler/detector 218 comprises a means for converting the RF signal traveling in each direction into a DC voltage signal whose level is a function of signal strength. In the preferred embodiment, the detector and coupler functions are implemented in a single device. In alternate embodiments, the detector and coupler functions may be implemented in separate circuits.

After the RF excitation signal and the RF reflection signal have been converted to separate DC voltage signals by the coupler/detector 218, the RF excitation signal is routed to the analog to digital converter circuit 214 circuit over a lead 234 and the RF reflection signal is routed to the analog to digital converter circuit 214 over a lead 238. The analog to digital converter circuit 214 includes a first and a second synchronous sample-hold circuit and a first and a second analog to digital converter, all of which are controlled by the microprocessor 204 according to the instructions contained in the software running on the microprocessor 204. A trigger signal from the microprocessor 204 causes samples of the RF excitation signal and the RF reflection signal to be taken synchronously. The RF excitation signal is stored in the first synchronous sample-hold circuit and the RF reflection signal is stored in the second synchronous sample-hold circuit. The first analog to digital converter quantifies (i.e. converts to a digital signal) the RF excitation signal (i.e. converts it to a digital signal) and the second analog to digital converter quantifies the RF reflection signal (i.e. converts it to a digital signal) for numeric calculations contained in the software running on the microprocessor 204. The precision of the first and second analog to digital converters, the conversion rate and the sample/hold specifications collectively determine the measurement resolution.

After the digitization process is completed by the first and second analog to digital converters, the digitized signal representing the RF excitation signal is directed to the microprocessor 204 over the bus 242. Similarly, the digitized signal representing the RF reflection signal is directed to the microprocessor 204 over the bus 242. The software running on the microprocessor 204 uses the digitized signal representing the RF reflection signal as the value for the reflected power ($P_{Refl}$). Similarly, the digitized signal representing the RF excitation signal is used as the value for the forward power $P_{Fwd}$).

Next, the reflection coefficient "ρ" is determined at each of the N frequencies by the software running on the microprocessor 204 by performing the calculation described previously. Namely, the reflection coefficient "ρ" is defined as the reflected power ($P_{Refl}$) divided by the forward power ($P_{Fwd}$). This calculation yields the set of ordered pairs of data points (ρ, ω) for each of the N frequencies, where $\omega=2\pi f$. The set of ordered pairs (ρ, ω) are then fit to a polynomial, such as the polynomial given in equation 2, by the software running on the microprocessor 204.

Similarly, the software running on the microprocessor 204 determines the values of the coefficients A, B, C and D in the polynomial regression, takes the first derivative of equation 2 to yield equation 3, and calculates the optimum frequency ($\omega_{opt}$) by setting equation 3 equal to zero, substituting in the known values of the coefficients A, B and C derived from equation 2, and then determining $\omega_{opt}$ by finding the roots of equation 3. The real root minima is selected by the microprocessor as the optimum frequency ($\omega_{opt}$).

In alternate embodiments, other methods for determining the optimum frequency ($\omega_{opt}$) can be used. In a first alternate embodiment, polynomials of degrees other than three can be used. For example, a polynomial of higher degree (e.g. four or five) can be substituted for the third degree polynomial shown in equation 2. In a second alternate embodiment, a function other than a polynomial can be substituted for the third degree polynomial shown in equation 2. In either the first or second alternate embodiments, the optimum frequency ($\omega_{opt}$) is found in the same way as was described previously with respect to the third degree polynomial, except that the new function is used in the regression. Specifically, a plurality of frequency values $F_N$ that span a frequency range containing an optimum frequency for driving a piezoelectric transducer are selected. The reflection coefficient "ρ" at each frequency value $F_N$ is determined, where "ρ" is the reflected power divided by the forward power. This generates a data set of ordered pairs of the reflection coefficient and the frequency value. The data set is fit to the function (i.e. to the polynomial of degree other than three, or to the non-polynomial function), and the first derivative equation of the function is determined. Then the roots of the first derivative equation are determined to yield a set of roots. Finally, the optimum frequency is selected from the set of roots.

In a third alternate embodiment, the reflection coefficient "ρ" is replaced with just the reflected power ($P_{Refl}$). This embodiment may produce less accurate results, with the loss of accuracy (if any) depending on the level of stability of the RF excitation signal during the measurement process. In the third alternate embodiment, the optimum frequency ($\omega_{opt}$) is found in the same way as was described previously with respect to the third degree polynomial, or the polynomial of degree other than three, or the non-polynomial function, except that the reflected power replaces the reflection coefficient. Specifically, a plurality of frequency values $F_N$ that span a frequency range containing an optimum frequency for driving a piezoelectric transducer are selected. The reflected power ($P_{Refl}$) at each frequency value $F_N$ is determined. This generates a data set of ordered pairs of the reflected power and the frequency value. The data set is fit to the function (i.e. to the third degree polynomial, the polynomial of degree other than three, or to the non-polynomial function), and the first derivative equation of the function is determined. Then the roots of the first derivative equation are determined to yield a set of roots. Finally, the optimum frequency is selected from the set of roots.

Figure 9:
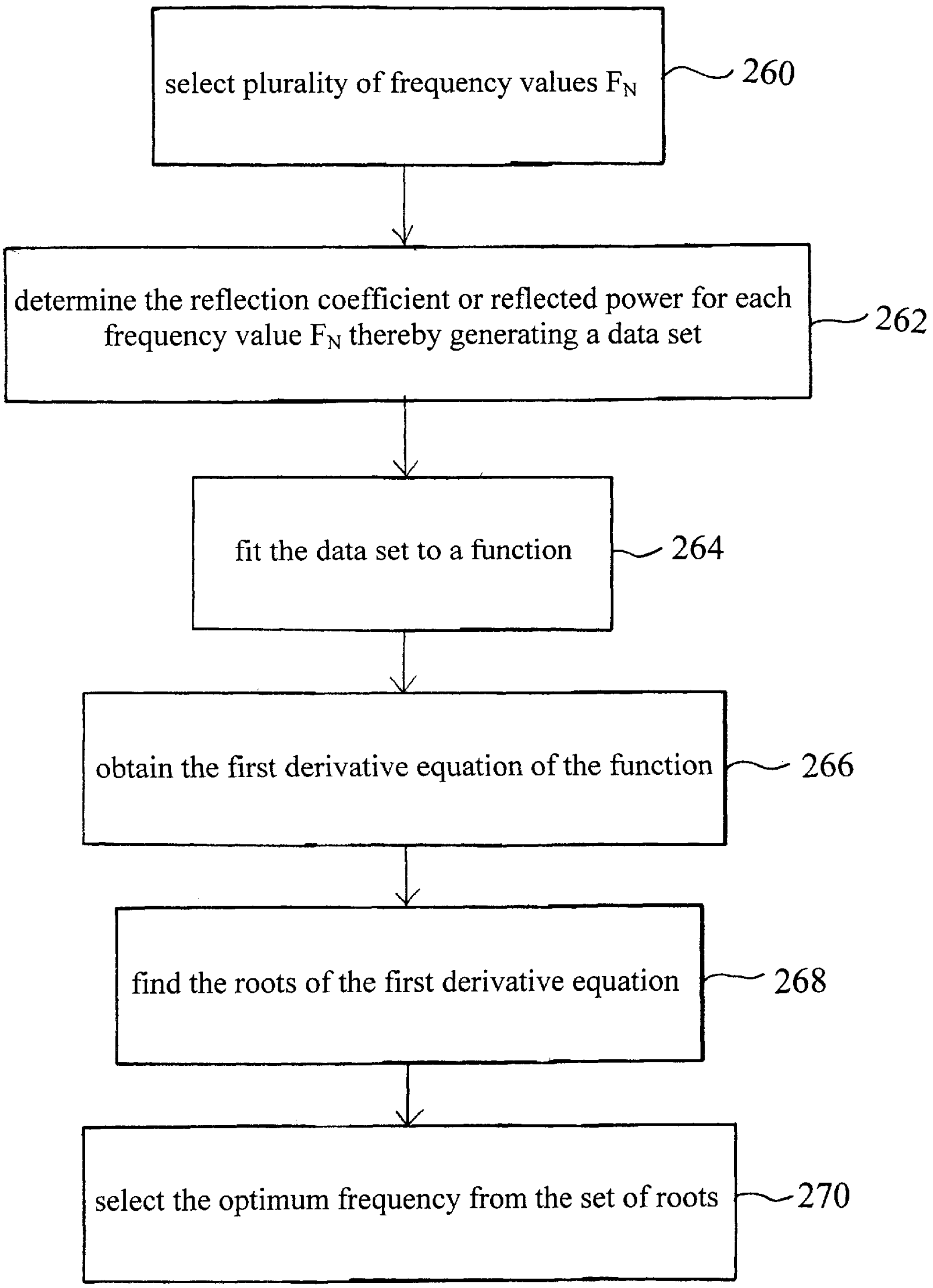
FIG. 9 is a flowchart illustrating the method of the present invention.

FIG. 9 is a flowchart illustrating the method for determining the optimum frequency for driving the transducer system 124. The blocks 260, 262, 264, 266, 268 and 270 illustrate the steps in the method that were described previously.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method for selecting an optimum frequency for driving a transducer comprising the steps of:

selecting a plurality of frequency values that span a frequency range containing an optimum frequency for driving a piezoelectric crystal;

determining a reflection coefficient "ρ" at each frequency value, where "ρ" is the reflected power divided by the forward power, thereby generating a data set of ordered pairs of the reflection coefficient and the frequency value;

fitting the data set to a function;

obtaining the first derivative equation of the function;

finding the roots of the first derivative equation to yield a set of roots; and selecting the optimum frequency from the set of roots.

2. The method of claim 1 wherein the function is a polynomial.

3. The method of claim 1 wherein the function is a third degree polynomial.

4. A method for selecting an optimum frequency for driving a transducer comprising the steps of:

selecting a plurality of frequency values that span a frequency range containing an optimum frequency for driving a piezoelectric crystal;

determining a reflected power at each frequency value, thereby generating a data set of ordered pairs of the reflected power and the frequency value;

fitting the data set to a function;

obtaining the first derivative equation of the function;

finding the roots of the first derivative equation to yield a set of roots; and selecting the optimum frequency from the set of roots.

5. The method of claim 4 wherein the function is a polynomial.

6. The method of claim 4 wherein the function is a third degree polynomial.

7. A method for selecting an optimum frequency for driving a transducer comprising the steps of:

selecting a plurality of frequency values $F_N$ that span a frequency range containing an optimum frequency for driving a piezoelectric crystal;

determining a reflection coefficient "ρ" at each frequency value $F_N$, where "ρ" is the reflected power divided by the forward power, thereby generating a data set of ordered pairs of the reflection coefficient and the frequency value;

fitting the data set to a polynomial to obtain the coefficients A, B, C and D in a third degree polynomial equation $f(\omega)=A\omega^3+B\omega^2+C\omega+D$;

obtaining the first derivative of the third degree polynomial to yield the equation $f(\omega)=3A\omega^2+2B\omega+C$;

finding the roots of the first derivative equation to yield a set of roots; and selecting the optimum frequency from the set of roots.

8. The method of claim 7 wherein the plurality of frequency values $F_N$ comprises approximately thirty frequency values.

9. The method of claim 7 wherein the optimum frequency is the real root that is a minima in the frequency range.

10. The method of claim 7 wherein each frequency value in the data set is expressed in radians.

11. A system for selecting a frequency for driving a transducer comprising:

a microprocessor;

a radio frequency (RF) frequency generator for generating an RF excitation signal at a specific frequency, the specific frequency being somewhere in the frequency range of approximately 10.0 KHz to 10.0 MHz;

a transducer means for converting the RF excitation signal into acoustic energy;

a directional coupler/decoupler means for separating the RF excitation signal from an RF reflected signal, the RF reflected signal arising, at least in part, from the RF excitation signal interacting with the transducer means;

an analog to digital converter means connected to the directional coupler/decoupler means for converting the RF excitation signal into a digital excitation signal that can be processed by the microprocessor and for converting the RF reflected signal into a digital reflected signal that can be processed by the microprocessor; and software means running on the microprocessor for using the digital excitation signal and the digital reflected signal to calculate a reflection coefficient at the specific frequency, and for using a plurality of reflection coefficients measured at a plurality of specific frequency values to determine an optimum drive frequency.

12. The system of claim 11 wherein the software means fits the plurality of reflection coefficients measured at the plurality of specific frequency values to a third degree polynomial to obtain the coefficients A, B, C and D in the third degree polynomial equation $f(\omega)=A\omega^3+B\omega^2+C\omega+D$, calculates the first derivative of the third degree polynomial to yield the equation $f(\omega)=3A\omega^2+2B\omega+C$, finds the roots of the first derivative equation to yield a set of roots, and selects the optimum drive frequency from the set of roots.

13. The system of claim 12 wherein the optimum drive frequency is the real root that is a minima in the frequency range.

14. The system of claim 11 wherein the plurality of specific frequency values comprises approximately thirty frequency values.

* * * * *